United States Patent [19]
Rohrbaugh

[11] Patent Number: 5,904,042
[45] Date of Patent: May 18, 1999

[54] DIESEL EXHAUST CONDITIONING SYSTEM

[76] Inventor: David Rohrbaugh, 1947 Wilson Corona Rd., Oakland, Md. 21550

[21] Appl. No.: 08/919,216

[22] Filed: Aug. 28, 1997

[51] Int. Cl.$^6$ ........................................................ F01N 3/00
[52] U.S. Cl. ................................. 60/298; 60/297; 60/315; 422/172; 422/171; 422/177
[58] Field of Search .............................. 60/298, 297, 301, 60/315, 320, 307; 422/171, 172, 174, 177

[56] References Cited

U.S. PATENT DOCUMENTS

| | | |
|---|---|---|
| 3,645,093 | 2/1972 | Thomas . |
| 3,820,327 | 6/1974 | Henault . |
| 3,882,677 | 5/1975 | Eknayan ...................................... 60/298 |
| 3,967,929 | 7/1976 | Tamazawa et al. . |
| 4,264,344 | 4/1981 | Ludecke et al. . |
| 4,744,217 | 5/1988 | Goerlich et al. . |
| 5,105,619 | 4/1992 | Arai . |
| 5,243,819 | 9/1993 | Woerner et al. . |
| 5,272,874 | 12/1993 | Paas . |
| 5,403,557 | 4/1995 | Harris . |
| 5,431,706 | 7/1995 | Paas . |
| 5,488,826 | 2/1996 | Paas . |
| 5,492,676 | 2/1996 | Katatani et al. .......................... 422/168 |
| 5,542,294 | 8/1996 | Heath .......................................... 60/293 |
| 5,565,178 | 10/1996 | Dove et al. .............................. 422/181 |

*Primary Examiner*—Christopher Verdier
*Assistant Examiner*—Binh Tran
*Attorney, Agent, or Firm*—Richard C. Litman

[57] ABSTRACT

A diesel exhaust conditioning system removes harmful gaseous and particulate pollutants from the exhaust of a diesel engine, and also lowers the temperature of the emitted exhaust and of the shroud surrounding the pollution control components of the device. The system includes at least one combination catalytic converter and particulate filter, structured to operate at a sufficiently high temperature as to convert potentially harmful gaseous pollutants to innocuous substances, and which also collects and oxidizes carbon and hydrocarbon particles in the diesel exhaust to convert them to innocuous substances as well. The catalytic converter(s) is contained in an insulated canister for containing the heat generated by the catalytic reactions, with the insulation also serving to lower the outside temperature of the canister. A shroud is placed around the canister and other components, with an axial fan blowing ambient air between the canister and shroud to reduce the exterior temperature of the shroud to an acceptable level. The ambient air is mixed with the exhaust at the downstream end of the system, to lower the temperature of the exhaust gases to an acceptable level. The system is particularly well suited for use with diesel engines used in enclosed environments, such as the underground mining industry, but may be structured for use with diesel engines operating in other environments as well. A seamless, explosion proof shroud may also be used in environments where potential explosion hazards may exist, such as potentially explosive gases and dust in an underground mining environment.

20 Claims, 2 Drawing Sheets

DIESEL EXHAUST CONDITIONING SYSTEM

BACKGROUND OF THE INVENTION

1. Field of the Invention

The present invention relates generally to emissions control systems for internal combustion engines, and more specifically to an exhaust conditioning system for diesel engines. The present system provides for the reduction of oxides of nitrogen, carbon monoxide, and unburned hydrocarbons, as well as the reduction of carbon particulates in the diesel exhaust, using one or more combination catalytic converters and particulate filters. A shroud surrounds the catalytic converter-filter and other components, to insulate the system and reduce external temperatures.

2. Description of the Related Art

Exhaust emissions from internal combustion engines are recognized to be a very serious environmental hazard, and accordingly, numerous ever more stringent laws and regulations require ever cleaner and purer exhaust emissions from such engines. Regulations directed to the diesel or compression ignition engine have generally not been quite so strict as those directed to spark ignition engines, due to the smaller number of diesel engines in operation and also due to the difficulty in reducing or eliminating the carbon particulates normally emitted by such engines.

Nevertheless, the reduction of exhaust emission products from diesel engines is important, particularly for such engines which are used in confined areas, such as generators in enclosed areas, diesel powered machinery used in the underground mining industry, etc. Obviously, it is critical that exhaust emissions be minimized to the greatest degree possible, particularly in the underground mining environment, where breathable air is absolutely critical and toxic gases such as carbon monoxide cannot be tolerated to any degree whatsoever.

Due to these factors, and the difficulty in reducing exhaust emissions from diesel engines to the required degree, many, if not most, jurisdictions either prohibit or greatly restrict the use of diesel powered machinery in underground mining operations. Those that permit such diesel machinery to be used in underground mining, require extremely strict emissions control for such engines. The Pennsylvania Article II-A Diesel Powered Equipment regulations, for example, require that carbon monoxide emissions be reduced to no more than 100 parts per million (ppm), that carbon particulates be reduced by 95% or more from their otherwise unrestricted output, and that exhaust gas temperatures be reduced to no more than 150 degrees Celsius (302 degrees Fahrenheit). These regulations have heretofore generally been considered to be mutually exclusive, as the reduction of emissions by means of a catalytic converter results in considerable heat output from the converter due to the catalytic reaction which serves to clean the emissions. Moreover, the particulate matter is another problem altogether.

Various means have been attempted to resolve this problem, with the solution generally being to cool the reaction in some manner to reduce the temperatures, while trapping the particulates in a separate filter element or the like and cleaning or disposing of the filter periodically. Water has been used as a filtering element, but the resulting sludge creates a maintenance headache and disposal problem, and water per se does little or nothing to reduce other emissions.

Accordingly, a need will be seen for a means of reducing the exhaust emissions of a diesel engine, particularly an engine in an enclosed environment such as an underground mine, and simultaneously reducing the carbon particulate output and temperature of the exhaust. The emissions and particulate reductions are preferably accomplished by means of a single system, rather than requiring separate catalytic converters and filters, although multiple catalytic converter units for treating different types of exhaust pollutants might be used, if so desired. Moreover, the temperature of the converter(s) and filter(s) combination should be maintained at a sufficiently high level so as to operate efficiently, with the system still producing a relatively cool exhaust at or below the above noted Pennsylvania requirements. A discussion of the related art of which the present inventor is aware, and its differences and distinctions from the present invention, is presented immediately below.

U.S. Pat. No. 3,645,093 issued on Feb. 29, 1972 to William L. Thomas describes an Air Pollution Control System For Internal Combustion Engines, comprising a combustion chamber into which unburned or partially burned hydrocarbons and/or exhaust products are passed. An air pump forces additional oxygen into the chamber for further combustion of the exhaust products, with an ignition source also being provided. A separate coolant pump is used to circulate a liquid coolant around the outside of the combustion chamber shell. No catalytic converter is disclosed by Thomas. The air pump does not provide any cooling for the system, as does the axial fan of the present exhaust system. Rather, the Thomas air pump creates additional heat by providing further oxidation of exhaust output, thus requiring Thomas to provide cooling for the system using some other means, i.e., liquid.

U.S. Pat. No. 3,820,327 issued on Jun. 28, 1974 to Claude Henault describes a Temperature Regulator For A Catalytic Converter, in which air warmed by passing through an engine coolant radiator, or ambient air, is selectively passed through a shroud around a catalytic converter in order to control the temperature of the converter. While some form of temperature regulation of a catalytic converter used in the present invention could be incorporated, the airflow provided by the cooling fan of the present system is not for cooling the converter-filter, but rather for cooling the outside of the converter canister and surrounding shroud in order to reduce the temperature of the shroud to a point no higher than 150 degrees Celsius.

U.S. Pat. No. 3,967,929 issued on Jul. 6, 1976 to Tsuyoshi Tamazawa et al. describes an Exhaust Gas Purifying System incorporating an air pump for delivering additional air into the exhaust manifold for further oxidation of unburned hydrocarbons and the like, but further incorporating a selector valve for routing the air through a catalytic converter downstream from the exhaust manifold. The theory of operation is that the excess air may be routed through the catalytic converter for cooling the converter if it gets too hot. However, the excess air would serve to oxidize unburned hydrocarbons in the converter, thus further increasing the heat output of the converter. The air delivery system of the present invention circulates around the outside of the converter and filter, between the converter canister and surrounding shroud, to cool the exterior of the shroud below a predetermined level.

U.S. Pat. No. 4,264,344 issued on Apr. 28, 1981 to Otto A. Ludecke et al. describes a Diesel Engine Exhaust Particulate Trap comprising two concentric filter elements, unlike the axially disposed elements of the present system. At least the outer element of the Ludecke et al. device is formed of material such as pleated paper, which is totally unsuitable for use with the heat developed by the catalytic converter-filter element of the present invention. The present invention serves to remove carbon particulates by heating the catalytic converter-filter element(s) sufficiently highly by means of its reactions with carbon monoxide and other exhaust pollutants, to break down and oxidize such carbon particles as they pass through the converter-filter.

U.S. Pat. No. 4,744,217 issued on May 17, 1988 to Dieter Goerlich et al. describes a Particle Separator Arrangement In An Exhaust Pipe Of A Diesel Engine. The device includes a particle trap with further means for providing hot gases into the separator to burn out the carbon particles trapped therein, from time to time. The present invention does not include a separate particulate trap, but rather makes use of the combination filter and catalytic converter(s) used in the system to trap such particulates. The converter-filter(s) operate at a sufficiently high temperature to oxidize any unburned carbon particulates entering the converter, and thereby continuously and automatically clean the converter of particulates once the converter warms to normal operating temperature. The fan means used with the present invention does not cool the converter core, but rather directs cooling airflow around the outside of the converter-filter canister and between the canister and shroud to cool the exterior of the device to no more than a predetermined maximum temperature.

U.S. Pat. No. 5,105,619 issued on Apr. 21, 1992 to Minoru Arai describes a Regeneration System For Particulate Trap, wherein the heating means for the trap is an electric resistance heater. The present system utilizes the existing catalytic converter(s) both to trap particulates as well as to oxidize those trapped particulates by means of the heat generated in the catalytic converter(s). Arai does not disclose a catalytic converter, nor any air ducting around the exterior of the trap, as is provided for cooling the exterior housing of the present system.

U.S. Pat. No. 5,243,819 issued on Sep. 14, 1993 to Siegfried Woerner et al. describes an Exhaust Gas Cleaning Device For Diesel Engines, similar to the particulate separators or traps disclosed by Goerlich et al. and Arai and discussed above. Woerner et al. use a supplementary burner to heat the trap, rather than providing a combination catalytic converter-filter and using the heat of the catalytic reaction to burn off the particulates, as is done in the present invention. Moreover, Woerner et al. provide for the routing of the supplemental burner gases around the outside of the trap, in order to heat the relatively cooler outer portions of the trap. The present invention provides insulation around the catalytic converter canister, which serves (1) to maintain the heat of the converter for more efficient reaction, and (2) to reduce the convected heat to below a predetermined maximum level.

U.S. Pat. No. 5,272,874 issued on Dec. 28, 1993 to Norbert Paas describes an Exhaust Treatment System for mine certified diesel engines, for reducing exhaust emissions, particulates, and cooling the exhaust, as required by regulations. However, Paas goes about the solution to the problem in an entirely different manner than that of the present invention, using a considerably more complex apparatus which requires intermittent cleaning and replacement of certain elements. Paas provides a plurality of relatively small catalytic converters at each exhaust manifold tube, which small converters are inefficient and difficult to heat to the desired temperature for optimum operation, particularly in view of the water cooled exhaust manifold tubes immediately upstream of each of the converters. The present invention preferably utilizes a single combination catalytic converter and filter, or alternatively a series of two or more, rather than a plurality of such converters in parallel, as does Paas. Also, while Paas states that his catalytic converters serve to eliminate some of the particulate matter from the exhaust, he must rely upon a particulate filter downstream of the catalytic converters in order to remove the balance of particulate material, whereas the present system uses the catalytic converters to remove essentially all of the particulate material required to be removed from the exhaust by regulation. No additional filters or other elements are required in the present invention. Paas then circulates the engine exhaust through a heat exchanger in order to cool it sufficiently to pass through a relatively inexpensive disposable filter. However, the carbon buildup within the relatively cool heat exchanger must be handled in some manner. Paas responds to this problem by injecting water into the system from time to time, which flashes to steam to blow the carbon residue from the heat exchanger. While the Paas system does allow a relatively inexpensive, disposable exhaust particulate filter to be used, the apparatus providing for such an inexpensive filter is relatively complex and costly, unlike the present system. Where Paas uses water to cool his exhaust system, the present system is cooled with air, with the cooling medium never entering the exhaust system until the exhaust has been completely processed, at the extreme output end of the system.

U.S. Pat. No. 5,403,557 issued on Apr. 4, 1995 to Harold L. Harris describes an Emission Control Apparatus For Diesel Engine, including a particulate trap and noise reduction device combined in a single unit. The particulate trap is upstream of a separate catalytic converter, to remove substantially all of the particulates from the exhaust gases before they reach the converter, unlike the present invention which utilizes the combination converter and filter to remove particulates in addition to other undesirable exhaust gases. While Harris also provides some sound muffling means with his apparatus, he is silent regarding any means of reducing the exterior temperature of the device. The present system includes external temperature reduction means, comprising a fan for air flow between the insulated catalytic converter canister and a surrounding shroud.

U.S. Pat. No. 5,431,706 issued on Jul. 11, 1995 to Norbert Paas describes a Disposable Particulate Filter generally comprising a pair of concentric, toroidally shaped filter elements. Exhaust passes between the two elements, with filtered exhaust passing either outwardly around the outermost element, or centrally outward from the center of the inner element. Paas notes that experiments wherein the semi-permanent catalytic converter element has been used to trap and oxidize the particulate material from a diesel exhaust have not been successful when such engines are used in light duty cycles (column 1, lines 62–68), but fails to consider insulating the converter to retain heat and to reduce the temperature of the outer shell, as is done in the present invention.

Finally, U.S. Pat. No. 5,488,826 issued on Feb. 6, 1996 to Norbert Paas describes a Heat Isolated Catalytic Converter. This patent is a continuation in part of Paas' earlier issued U.S. Pat. No. 5,272,874, and incorporates a similar catalytic converter structure, with separate converters housed in each exhaust manifold tube from each exhaust port of the engine. However, the continuation patent provides for a pair of annular insulation gaps or spaces concentric with each converter, to reduce heat transfer to the exhaust manifold tubes. It would appear that Paas recognized the shortcomings of the catalytic converter structure of his earlier issued '874 patent, with the relatively small converters in direct contact with the liquid cooled exhaust manifold tubes and resulting inability of the converters to attain sufficient temperature for suitable operation and for achieving the stated purpose of oxidizing some of the particulate matter of the diesel exhaust. However, the plural, relatively small converters of the Paas '826 patent are still considerably more difficult to heat to an optimum operating temperature than the present single converter and filter combination, or plural converters and filters in series, of the present invention, and the liquid cooling provided by Paas further lowers the temperature of adjacent structures to a degree considerably less than that desired or permitted by regulation.

None of the above inventions and patents, taken either singly or in combination, is seen to describe the instant invention as claimed.

SUMMARY OF THE INVENTION

The present invention comprises a diesel exhaust conditioning system for removing pollutants and solid particulate material from the exhaust of a diesel engine, and further for cooling the system and exhaust gases emanating therefrom. The present system is structured to meet or exceed most current regulations for exhaust emissions and related aspects of internal combustion engine operation in underground mining operations, such as Pennsylvania Article II-A Diesel Powered Equipment regulations. These regulations require that the system reduce carbon monoxide to no more than 100 parts per million, reduce diesel particulates by 95% or more of their untreated quantity, and cool the exhaust gas temperature to no more than 302 degrees Fahrenheit before leaving the system.

The present diesel exhaust conditioning system accomplishes this primarily by a single catalytic converter, or a series of two or more converters in series with one another. The converter(s) also acts as the filter or trap for the particulate material produced by the diesel exhaust, with the normal operating temperatures of the catalytic converter(s) being sufficiently high to burn off or oxidize the carbon particles so that a conventional trap or filter which would require periodic cleaning or replacement, is not required. (It should be understood that the terms "filter" and "trap" used with the catalytic converter of the present invention, do not describe merely capturing particulate material, as in a conventional trap, but also oxidize or convert the particulates to innocuous gases, in the manner of a catalytic converter.) Insulation is provided surrounding the converter(s), in order to maintain the high operating temperatures required and further to keep the exterior of the device relatively cool. An axial fan is provided to blow cooling air between the converter canister and a surrounding shroud, in order to reduce the temperature of the outer shroud to acceptable levels. The air is mixed with the exhaust at the downstream end of the device, in order to reduce the temperature of the exhaust to acceptable levels as it leaves the system.

Accordingly, it is a principal object of the invention to provide an improved diesel exhaust conditioning system for the reduction of gaseous and particulate emissions and exhaust temperature from a diesel internal combustion engine.

It is another object of the invention to provide an improved diesel exhaust conditioning system which is particularly structured for use with diesel engines in the underground mining environment and other enclosed areas of operation, and which may be structured for use with other types of internal combustion engines and in other operating environments.

It is a further object of the invention to provide an improved diesel exhaust conditioning system which utilizes catalytic converter means for reducing noxious and toxic gaseous exhaust emissions from a diesel engine, with the catalytic converter means also serving as filter means for reducing particulate exhaust emissions from the engine as well.

An additional object of the invention is to provide an improved diesel exhaust conditioning system including air cooling means for reducing the temperature of the system and exhaust.

Still another object of the invention is to provide an improved diesel exhaust conditioning system which in at least one embodiment, is structured as an explosion proof device for use in enclosed areas potentially containing explosive gases, dust, and the like.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a diesel exhaust conditioning system which converts hazardous exhaust gases such as oxides of nitrogen, carbon monoxide, and unburned hydrocarbons to innocuous gases, and further converts the solid hydrocarbon and carbon particulates emitted by diesel engines, to innocuous gaseous form. These multiple achievements are accomplished by means of one or more catalytic converters, which also act as a particulate trap(s) or filter(s) for the device. As particulates enter the catalytic converter and filter assembly, they are oxidized further by the heat emitted from the catalytic reaction of the conversion of other gaseous exhaust emissions, to be converted to a gaseous state. The present catalytic converter means is maintained at a sufficiently high temperature to accomplish the above functions once it has been thoroughly heated by normal operation.

At the same time, it is critical that the outer surface of the assembly, and the exhaust gases emanating from the device, be kept below a predetermined maximum temperature. The present invention also accomplishes this, in order to meet or exceed regulations developed in various jurisdictions for diesel engines used in enclosed environments, such as the underground mining industry. As an example of the above, Pennsylvania Article II-A Diesel Powered Equipment Regulations have relatively strict limits as to gaseous and particulate emissions, and also limit the exhaust temperature and external temperature of the exhaust system, as described further above.

Figure 1:
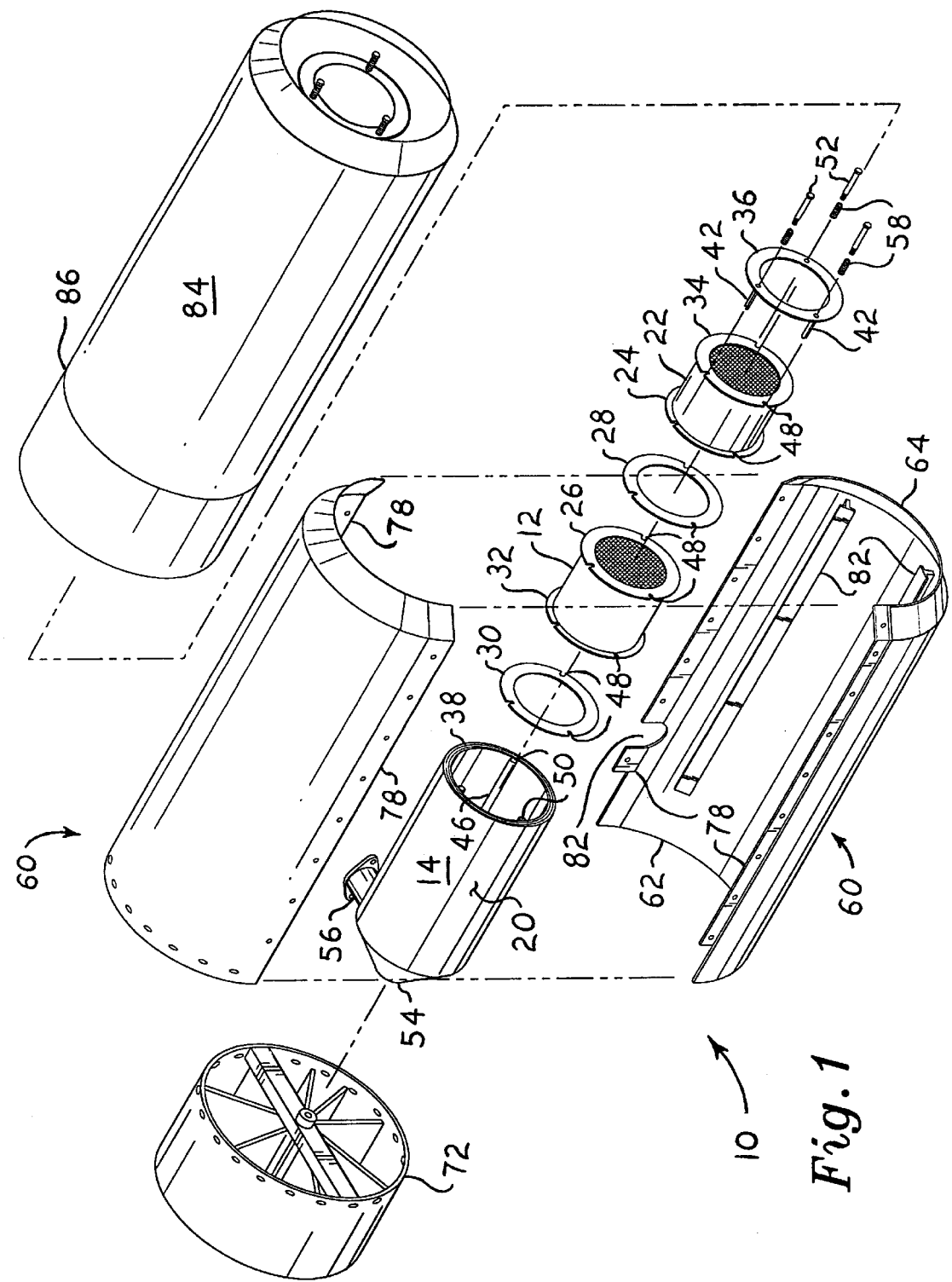
FIG. 1 is an exploded perspective view of the present diesel exhaust conditioning system, showing its various components and their relationship.

FIG. 1 provides an exploded perspective view of the present diesel exhaust conditioning system, designated generally by the reference numeral 10 throughout the drawings.

The system 10 includes at least one catalytic converter 12 therein, which is preferably a three way converter, capable of oxidizing carbon monoxide and unburned hydrocarbons, as well as reducing oxides of nitrogen to their component gases. Other types of converters may be incorporated in the present invention, if desired. Such converters are conventional in the art and are known to be used with both spark ignition and conventional compression ignition (diesel) engines, such as the previously known diesel engine disclosed in any of the U.S. Patents to Paas and discussed further above, incorporated herein by reference.

The converter 12 is capable of accepting relatively high reaction temperatures, for oxidizing the solid carbon and hydrocarbon particulates which are typically emitted in diesel engine exhaust. The converter 12 of the present invention may be formed of coated ceramic materials to withstand the heat output generated in the conversion of both gaseous and solid particulates. Typically, diesel engine emissions controls have incorporated a conventional catalytic converter, in line with a particulate filter or trap to capture the solid particulates from the diesel exhaust. The present invention enables the catalytic converter to act as the particulate filter simultaneously in combination with its exhaust gas conversion, by means of the relatively high temperatures at which the converter-filter 12 is maintained during operation.

The combination catalytic converter and particulate filter or trap 12 is removably installed within a closely fitting canister 14 which surrounds the converter-filter 12. The canister 14 is formed as a relatively thick structure, with one or more layers of insulation material 16 between the inner and outer shells 18 and 20, as shown more clearly in the partial section view of FIG. 2. This insulation 16 within the canister walls 18 and 20 serves to retain the heat generated by the converter and filter 12 within the canister 14 for more efficient operation, particularly relating to oxidation of the hydrocarbon and carbon diesel exhaust particles entering the converter-filter 12. The insulation 16 also serves to reduce heat conducted and radiated through the canister 14 by the converter-filter 12, thus reducing the temperature of the exterior wall or shell 20 of the canister 14.

A spark/flame arrestor 22 may be installed in series with the converter-filter 12, according to any requirement therefor and depending upon the operating environment of the system 10. The arrestor 22 is also removably installed in the canister 14, with the first or input end flange 24 of the spark arrestor 22 adjacent the second or output end flange 26 of the converter-filter 12 (they may be separated by a gasket 28, with an additional gasket 30 at the forward or inlet end flange 32 of the converter-filter 12), and the arrestor opposite second or output end flange 34 toward the corresponding canister second or output end 32. The spark arrestor 22 may also incorporate an additional catalytic converter, or converter-filter, similar to the device 12 discussed further above.

Figure 2:
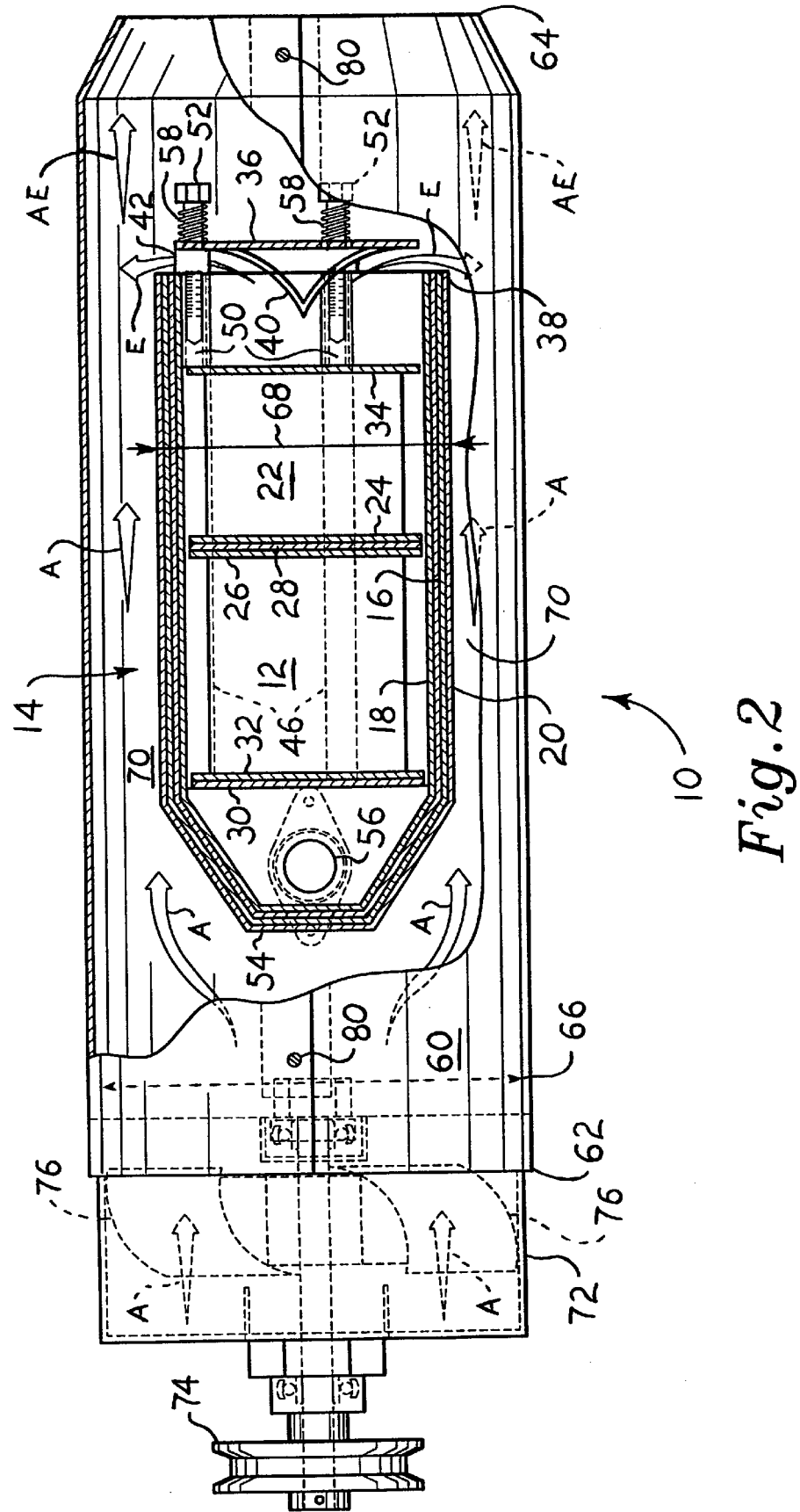
FIG. 2 is an elevation view in partial section of the assembled diesel exhaust conditioning system, showing various details thereof.

A diffuser 36 is installed behind the second or output end flange 34 of the spark arrestor 22, secured to the second or output end 38 of the canister 14. The diffuser 36 has a concentric, inwardly pointed conical projection 40, shown in FIG. 2, which serves to deflect exhaust gases flowing generally axially from the second or output end of the spark arrestor 22, radially outwardly, as indicated by the exhaust arrows E in FIG. 2. The diffuser 36 includes a plurality of peripheral, axial spacers 42, which serve to separate the outer rim of the diffuser 36 from the second end 38 of the canister 14, and define a radial exhaust gas passage 44 therebetween, as shown in FIG. 2.

The canister 14 includes a plurality of longitudinal ribs or ridges 46 formed along the inner surface 18 of the canister 14. It will be noted that the various flanges and gaskets 24 through 34 of the various components housed within the canister 14, each have a corresponding plurality of slots or grooves 48, as shown in FIG. 1. These peripheral slots 48 engage and mate with the ribs 46 formed within the canister 14, to hold the converter-filter 12, spark arrestor 22, and gaskets 28 and 30 within the canister 14 and prevent non-axial movement thereof relative to the canister 14.

The spacer channels 42 of the diffuser 36 correspond to and fit over each of the canister second ends of the ribs 46, and bear against the second end flange 34 of the spark arrestor 22 when the converter-filter 12, arrestor 22, and gaskets 28 and 30 are installed within the canister 14, thereby precluding axial movement of the components 12, 22, 28, and 30 within the canister 14.

The ribs 46 each include an axial threaded fastener passage 50 adjacent the second end 38 of the canister 14. A plurality of threaded fasteners 52 is used to secure the diffuser 36 to the second or exhaust output end 38 of the canister 14. Thus, the removable securing of the diffuser 36 to the second end 38 of the canister 14, by means of fasteners 52 engaging the passages 50 of the ribs 46, removably sandwiches the converter-filter 12, spark arrestor 22, and gaskets 28 and 30 between the diffuser 36 and the essentially closed first or exhaust inlet end 54 of the canister 14. (An exhaust inlet pipe or passage 56 is provided in the first end 54 of the canister 14, preferably laterally or radially disposed as shown in the drawings.) A corresponding plurality of springs 58 is provided between the heads of the fasteners 52 and the diffuser 36, to allow for longitudinal thermal expansion of the assembly comprising the converter-filter 12, spark arrestor 22, gaskets 28 and 30, and diffuser 36 within the canister 14.

The canister 14, with the above described components installed therein, is surrounded by a heat deflecting shroud 60. The shroud 60 has an open first or air entrance end 62, and an opposite open second or exhaust end 64. The inner cross sectional dimension or diameter 66 of the shroud 60 is larger than the outer cross sectional dimension or diameter 68 of the canister 14, with the difference between the two defining an airflow path 70 therebetween.

Air, indicated by the arrows A in FIG. 2, flows in a generally longitudinal or axial direction through the airflow path, to mix with and cool the exhaust gases E exiting from the canister 14, within the second end 64 of the shroud 60, as indicated by the mixed air and exhaust arrows AE. The air A is delivered by a fan 72 installed in the inlet opening 62 of the shroud 60. Preferably, the fan 72 is an axial fan, with the rotary axis of the fan disposed concentrically with the longitudinal axis of the remainder of the system 10, as shown in the drawing figures. However, other types of fans (offset "squirrel cage" blowers, etc.) may be used if so desired, depending upon the available space and its configuration for the present system 10.

It will be seen that even with the canister insulation 16 surrounding the converter and filter 12 installed therein, that the outer wall or surface 20 of the canister 14 will become quite hot during normal operation. Typically, the converter and filter 12 will reach temperatures of over one thousand degrees Fahrenheit, due to the catalytic reactions taking place therein as exhaust products are converted to harmless gases. Thus, the outer surface 20 of the canister 14 will likely reach temperatures of at least a few hundred degrees Fahrenheit, unless some cooling means is provided. The fan 72 provides cooling airflow A over the outside 20 of the canister 14, and also serves to cool the shroud 60 from any effects of radiated heat from the canister 14. The air A mixing with the exhaust E also serves to cool the exhaust temperature to levels acceptable according to regulations.

The fan 72 shown in FIG. 2 is mechanically powered, by a conventional V-belt (not shown) which turns a pulley 74, in turn driving the fan blades 76. The belt may be powered by the accessory drive of the diesel engine with which the system 10 is used. Thus, whenever the engine is running, the fan blades 76 are spinning to draw air A through the airflow path 70 between the canister 14 and shroud 60. Other means of powering the fan 72 may be provided as desired. For example, a conventional electric motor (not shown) may be used to power the fan 72, with a switch wired in parallel with an electric fuel pump for the engine, or some other electrical circuit which is activated simultaneously with the engine. An electrically powered fan might be advantageous in that electrical power to the fan could be controlled by a thermostat or temperature probe within the canister 14 or air flow passage 70, with the fan continuing to run and delivering cooling air through the shroud 60 after the engine is stopped. Another means of powering the fan might be to use the energy provided by the engine exhaust to turn an impeller which could be used to drive the fan, somewhat along the lines of a conventional exhaust driven turbosupercharger.

The shroud 60 shown in FIGS. 1 and 2 is formed of two pieces of relatively thin sheet material, each comprising a generally semicylindrical shroud half. The two shroud 60 components each include mating longitudinal flanges 78 (FIG. 1), which are secured to one another by screws 80 (FIG. 2). An engine exhaust inlet passage 82 is formed in each shroud 60 half, to fit around the exhaust inlet pipe 56.

The shroud 60 assembly is spaced apart from the canister 14 contained therein by a plurality of internal supports 82, as shown in FIG. 1. The supports 82 may comprise continuous lengths each having a T-cross section, with the crossmember of the T providing a relatively wide surface upon which the outer surface 20 of the canister 14 rests. Alternatively, a series of inwardly directed rods each having a support button thereon, might be used to space the shroud 60 away from the canister 14. Other means (springs, etc.) might also be used, as desired.

The present diesel engine exhaust conditioning system 10 may also be constructed as an explosion proof unit, if so desired, with relatively little modification. Such explosion proof construction is very important in various environments, such as the underground mining industry, where potentially explosive gases and dust are frequently found. An alternative shroud 84, formed of a single piece of relatively thick metal, may be used to house the canister 14, fan 72, and other components within the canister 14. Rather than assembling the shroud 60 laterally around the canister 14 and its components, the canister 14 is installed within the single piece shroud 84 by insertion into the first end 86 thereof. A second spark arrestor (not shown) may be installed between the canister 14 and the fan 72, with the fan 72 being installed to the first end 86 of the shroud 84 to complete the assembly. Other details as required by regulation and practice, such as welding the engine exhaust inlet pipe to the system to provide a leakproof seal, may be used as necessary.

It will be noted that the various components comprising the present exhaust conditioning system 10, i.e., the converter and filter 12, canister 14, spark arrestor 22, diffuser 36, assembled shroud 60 or single piece shroud 84, and fan 72, each have a cylindrical or round cross sectional shape, as shown in the drawing figures. The converter-filter 12 (and spark arrestor 22, if used) fit concentrically within the canister 14, with the preferably axial fan 72 fitting closely and concentrically within the first or inlet end 62 of the shroud 60 (or inlet end 86 of the single piece shroud 84), with the shroud 60 or 84 in turn fitting concentrically about the canister 14 and diffuser 36. However, the various components comprising the present diesel exhaust conditioning system 10 may be formed to have other geometric cross sectional shapes (oval, elliptical, rectangular, etc., as desired, depending upon the space or area in which the device is to be installed, and other considerations.

In summary, the present diesel engine exhaust conditioning system will be seen to provide a significant advance over systems of the prior art, used in the underground mining industry and other enclosed environments. The use of a catalytic converter operating at a relatively high temperature in order to convert noxious gases to innocuous products, and also to convert solid particulates to innocuous gases, eliminates the need for an additional particulate filter in the device. The catalytic converter and filter combination may be maintained at the desired temperature for accomplishing both of the above functions, by means of a durable, high temperature insulation (such as ceramic material, glass fiber, etc.) in the canister surrounding the converter and filter. Yet, both the outer temperature and exhaust temperature of the device are maintained within the limits required by regulation, by means of an outer shroud spaced apart from the insulated canister, and a fan blowing ambient air between the canister and shroud. The air passing between the canister and shroud is mixed with the relatively hot exhaust as it leaves the canister by means of a diffuser, thus lowering the exhaust gas temperature to a suitable level. The system is relatively durable and maintenance free, in comparison to systems requiring periodic coolant replenishment or filter cleaning or replacement. Yet, the device may be easily serviced as required, due to the bolt-in installation of the various components within the canister and the ease of removal of the shroud from the canister when required. The present exhaust conditioning system will serve well the underground mining industry and other fields requiring diesel engine power in enclosed environments, and may be readily adapted for use with other stationary or vehicular diesel engines with little or no modification.

It is to be understood that the present invention is not limited to the sole embodiments described above, but encompasses any and all embodiments within the scope of the following claims.

I claim:

1. A diesel exhaust conditioning system, comprising:
   at least one combination catalytic converter and particulate filter;
   a canister having a generally closed first end with an engine exhaust inlet therethrough and an opposite open second end, for containing said at least one converter and filter therein;
   a shroud having an open first end and an opposite open second end, for installing about said canister;
   said shroud being larger than said canister and defining an airflow path therebetween when said canister is installed within said shroud;
   a fan secured to said first end of said shroud, for blowing air between said canister and said shroud, for cooling said shroud; and
   a diffuser secured to said second end of said canister, for radially deflecting exhaust gases exiting from said converter and filter and said canister and mixing the exhaust gases with air within said airflow path between said canister and said shroud.

2. The diesel exhaust conditioning system according to claim 1, including insulation means disposed about said canister, for maintaining a high temperature within said converter and filter and for reducing the temperature of said shroud.

3. The diesel exhaust conditioning system according to claim 1, including at least one spark arrestor disposed between said at least one converter and filter and said diffuser.

4. The diesel exhaust conditioning system according to claim 1, wherein at least said converter and filter and said diffuser are removably installed to said canister.

5. The diesel exhaust conditioning system according to claim 1, wherein said shroud is split and comprises two mating components, removably joined along mutual longitudinal edges.

6. The diesel exhaust conditioning system according to claim 1, wherein said shroud is explosion proof and is formed as a single piece of thick metal.

7. The diesel exhaust conditioning system according to claim 1, wherein said engine exhaust inlet to said first end of said canister is radially disposed thereto, and said shroud includes an engine exhaust pipe passage formed laterally therethrough.

8. The diesel exhaust conditioning system according to claim 1, wherein said fan is axially disposed at said first end of said shroud, with said fan being powered by means selected from the group consisting of a belt and pulley, an electric motor, and exhaust driven means.

9. The diesel exhaust conditioning system according to claim 1, wherein said canister includes an inner surface having a plurality of longitudinal ribs formed therealong, with each of said ribs including an axial threaded fastener passage adjacent said second end of said canister;

at least said converter and filter having a first end and an opposite second end, with each said end having a peripheral flange extending outwardly therefrom, with each said flange including a plurality of slots corresponding to said ribs of said canister for mating with said ribs of said canister for securing at least said converter and filter removably within said canister;

said diffuser including a plurality of spacers extending therefrom and corresponding to said plurality of ribs within said canister, for defining an annular passage between said diffuser and said second end of said canister; and a plurality of threaded fasteners corresponding to each said threaded fastener passage of said plurality of ribs, for removably securing said diffuser to said second end of said canister.

10. The diesel exhaust conditioning system according to claim 1, wherein at least said converter and filter, said canister, said diffuser, said fan, and said shroud each have a round cross sectional shape, with said converter and filter fitting concentrically within said canister, said fan fitting concentrically within said first end of said shroud, and said shroud fitting concentrically about said canister and said diffuser.

11. A diesel engine and a diesel exhaust conditioning system therefor, comprising in combination:
a diesel engine;
a diesel exhaust conditioning system including at least one combination catalytic converter and particulate filter, a canister, a shroud, a fan, and a diffuser;

said canister having a generally closed first end with an engine exhaust inlet therethrough and an opposite open second end, for containing said at least one converter and filter therein;

said shroud having an open first end and an opposite open second end, for installing about said canister, with said shroud being larger than said canister and defining an airflow path therebetween when said canister is installed within said shroud;

said fan being secured to said first end of said shroud, for blowing air between said canister and said shroud, for cooling said shroud; and said diffuser secured to said second end of said canister, for radially deflecting exhaust gases exiting from said converter and filter and said canister and mixing the exhaust gases with air within said airflow path between said canister and said shroud.

12. The diesel engine and diesel exhaust conditioning system combination according to claim 11, including insulation means disposed about said canister, for maintaining a high temperature within said converter and filter and for reducing the temperature of said shroud.

13. The diesel engine and diesel exhaust conditioning system combination according to claim 11, including at least one spark arrestor disposed between said at least one converter and filter and said diffuser.

14. The diesel engine and diesel exhaust conditioning system combination according to claim 11, wherein at least said converter and filter and said diffuser are removably installed to said canister.

15. The diesel engine and diesel exhaust conditioning system combination according to claim 11, wherein said shroud is split and comprises two mating components, removably joined along mutual longitudinal edges.

16. The diesel engine and diesel exhaust conditioning system combination according to claim 11, wherein said shroud is explosion proof and is formed as a single piece of thick metal.

17. The diesel engine and diesel exhaust conditioning system combination according to claim 11, wherein said engine exhaust inlet to said first end of said canister is radially disposed thereto, and said shroud includes an engine exhaust pipe passage formed laterally therethrough.

18. The diesel engine and diesel exhaust conditioning system combination according to claim 11, wherein said fan is axially disposed at said first end of said shroud, with said fan being powered by means selected from the group consisting of a belt and pulley, an electric motor, and exhaust driven means.

19. The diesel engine and diesel exhaust conditioning system combination according to claim 11, wherein said canister includes an inner surface having a plurality of longitudinal ribs formed therealong, with each of said ribs including an axial threaded fastener passage adjacent said second end of said canister;

at least said converter and filter having a first end and an opposite second end, with each said end having a peripheral flange extending outwardly therefrom, with each said flange including a plurality of slots corresponding to said ribs of said canister for mating with said ribs of said canister for securing at least said converter and filter removably within said canister;

said diffuser including a plurality of spacers extending therefrom and corresponding to said plurality of ribs within said canister, for defining an annular passage between said diffuser and said second end of said canister; and a plurality of threaded fasteners corresponding to each said threaded fastener passage of said plurality of ribs, for removably securing said diffuser to said second end of said canister.

20. The diesel engine and diesel exhaust conditioning system combination according to claim 11, wherein at least said converter and filter, said canister, said diffuser, said fan, and said shroud each have a round cross sectional shape, with said converter and filter fitting concentrically within said canister, said fan fitting concentrically within said first end of said shroud, and said shroud fitting concentrically about said canister and said diffuser.

* * * * *